(12) United States Patent
Bellve

(10) Patent No.: US 9,441,391 B2
(45) Date of Patent: Sep. 13, 2016

(54) EARTHQUAKE PROTECTION POD
(71) Applicant: QPIP Limited, Thorndon (NZ)
(72) Inventor: Bruce Winston Bellve, Kapiti Coast (NZ)
(73) Assignee: QPIP Limited, Thorndon, Wellington (NZ)
( * ) Notice: Subject to any disclaimer, the term of this patent is extended or adjusted under 35 U.S.C. 154(b) by 0 days.
(21) Appl. No.: 14/330,148
(22) Filed: Jul. 14, 2014

(65) Prior Publication Data
US 2016/0010355 A1 Jan. 14, 2016

(51) Int. Cl.
*E04H 9/02* (2006.01)
*E04B 1/38* (2006.01)
*A47C 31/00* (2006.01)
*F16B 12/40* (2006.01)
*E04B 1/58* (2006.01)

(52) U.S. Cl.
CPC ............ *E04H 9/024* (2013.01); *A47C 31/002* (2013.01); *E04B 1/5831* (2013.01); *F16B 12/40* (2013.01)

(58) Field of Classification Search
CPC ....... E04H 9/028; E04H 9/029; E04H 9/024; E04H 9/06; E04H 9/10; E04H 9/02; E04B 1/34331; E04B 1/34326; E04B 1/5831; E04B 2001/2421; E04B 2001/2451; E04F 2201/013; E04F 2201/0123; Y10T 403/4641; Y10T 403/4608
See application file for complete search history.

(56) References Cited

U.S. PATENT DOCUMENTS

| | | | | |
|---|---|---|---|---|
| 1,473,817 A * | 11/1923 | Hathaway | | A47B 57/16 108/157.17 |
| 2,910,314 A * | 10/1959 | Klein | | 403/174 |
| 3,224,823 A * | 12/1965 | Schulze | | A47F 3/004 312/108 |
| 3,392,689 A * | 7/1968 | Ferdinand | | A47B 57/18 108/110 |
| 3,462,021 A * | 8/1969 | Hawke | | A47F 5/14 108/101 |
| 3,522,960 A * | 8/1970 | Moore | | E04H 17/1413 248/230.9 |
| 3,972,639 A * | 8/1976 | Lening | | F16B 7/0486 256/59 |
| 4,443,992 A * | 4/1984 | Shechter | | E04B 1/3483 52/506.05 |
| 4,653,952 A * | 3/1987 | Hopkins | | E04B 1/585 403/206 |
| 4,813,191 A * | 3/1989 | Huang | | 52/167.1 |
| 4,973,110 A * | 11/1990 | Nyquist | | A47B 47/03 108/187 |
| 5,241,717 A * | 9/1993 | Ward | | E04H 9/02 248/165 |
| 5,662,132 A | 9/1997 | Larsen | | |
| 6,349,508 B1 | 2/2002 | Ju et al. | | |
| 6,402,414 B1 * | 6/2002 | Kanodia et al. | | 403/230 |
| 6,786,009 B1 * | 9/2004 | McGunn et al. | | 52/36.2 |
| 7,300,059 B2 * | 11/2007 | Caruso | | A63B 63/004 273/400 |
| 2002/0095879 A1 * | 7/2002 | Fanucci et al. | | 52/167.3 |
| 2004/0237419 A1 * | 12/2004 | MacWatt | | 52/79.1 |
| 2009/0165419 A1 * | 7/2009 | Richard et al. | | 52/650.2 |
| 2009/0293420 A1 * | 12/2009 | Smith et al. | | 52/783.1 |
| 2010/0043629 A1 * | 2/2010 | Carberry et al. | | 89/36.02 |
| 2012/0079968 A1 * | 4/2012 | von Bereghy | | 109/1 S |

FOREIGN PATENT DOCUMENTS

DE 102011111156 A1 * 2/2013
EP 2582266 B1 * 10/2015
FR 2753223 A1 * 3/1998 ............. E04H 9/02

* cited by examiner

*Primary Examiner* — Christine T Cajilig
(74) *Attorney, Agent, or Firm* — Klarquist Sparkman, LLP

(57) ABSTRACT

An earthquake protection pod for providing a safe space primarily for office personnel has a structure which may be sized to fit beneath a desk, which can support considerable weight and which provides a small crush zone in its structure to take the initial surge of a massive overload. Legs support a frame by sockets which have a crush zone for vertical impact loads. The pod is assembled on site.

10 Claims, 4 Drawing Sheets

EARTHQUAKE PROTECTION POD

TECHNICAL FIELD

The invention generally relates to structures to protect building occupants from earthquake effects.

More particularly the invention relates to protective structures fitting under an office desk or similar furniture and allowing an office occupant to enter the protective structure which is resistant to overhead impact.

BACKGROUND ART

Articles such as earthquake or tornado protection pods or protection structures are known.

Such a structure is known, for instance, from U.S. Pat. No. 5,662,132 entitled "Structural Protective Shelter" and granted on Sep. 2, 1997 which describes a tubular steel structure designed to be used around a bed, chair or desk. The structure is comparatively large and not easily assembled or moved.

U.S. Pat. No. 6,349,508 describes a high strength case with openings to allow a person to enter and remain within for some time, however the case is comparatively large and an integral whole and again is not easily moved.

Such structures fail to solve all the known problems of earthquake protection pods since they do not readily allow placement where an office worker can seek shelter and are not amenable to assembly on site.

Therefore a need exists for a solution to the problem of ease of access, ease of placement and ease of construction.

The present invention provides a solution to this and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

SUMMARY OF THE INVENTION

The invention consists in a protection pod having at least three compression resistant elongate legs capable of resting substantially vertically on a floor, each leg having at the upmost end a socket capable of receiving laterally within itself at least one portion of a bracing frame extending between the upmost ends of all the legs, each socket and received portion of bracing frame being retainable together by a fastening means such that the bracing frame is retained substantially at right angles to the legs and has a spacing between socket and bracing frame which will crush under loading on the upmost end of the socket.

Wherein the protection pod has at least one brace extending between the lower portion of a first leg and a second leg.

Wherein the braces are lateral.

Wherein the braces are at an angle and in the plane between the first leg and the second leg.

Wherein the pod has a floor plate, the floor plate being affixed to the lowermost end of each leg of the protection pod.

wherein the floor plate has a stub fitting within each leg of the pod.

Wherein the socket at the upmost end of a leg has a lower crush resistance to vertical forces than the remainder of the substantially vertical leg of which it forms a part.

Wherein the pod is dismantleable and relocatable.

These and other features of as well as advantages which characterise the present invention will be apparent upon reading of the following detailed description and review of the associated drawings.

DESCRIPTION OF THE INVENTION

Figure 1:
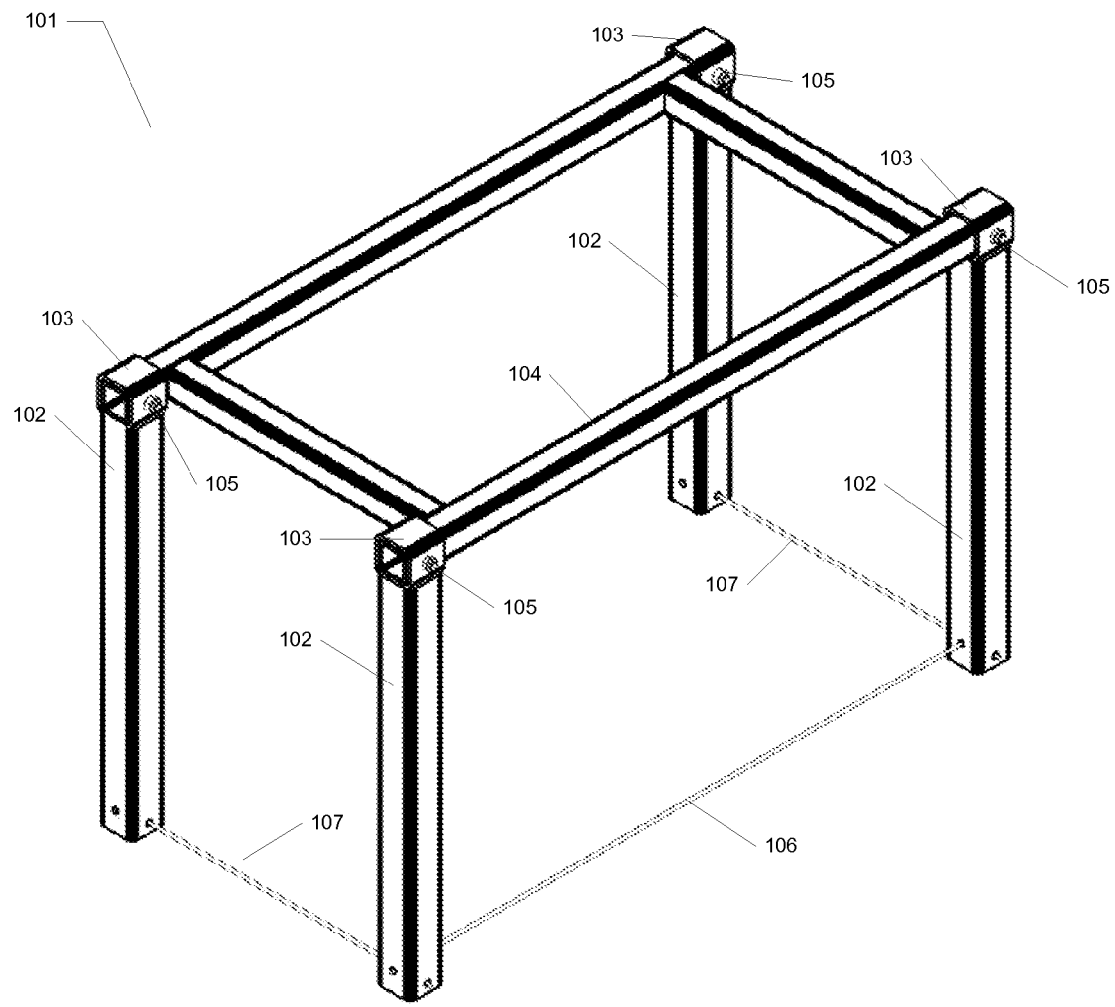
FIG. 1 is a rear perspective view of a protection pod.

Referring now to FIG. 1 a protection pod 101 is shown. The pod is intended to fit under an item of office furniture such as a desk and includes leg posts 102 resting on a floor with frame sockets 103 at the top of the legs, and a top frame 104 which locates into the sockets 103. The top frame is intended to clear the bottom of a desktop so that a pod may be slid under a desk, but differing dimensions may be used for differing furniture. The space within the pod is sufficient to easily accommodate a seated hunched person, and someone within the pod would be substantially protected from impacts from above. The top frame shown in FIG. 2 includes elongated top frame members 115, 117 with a respective frame end 301 at each end of the frame members 115, 117 that is positioned in a respective one of the sockets 103 (See also FIG. 3). The top frame of FIG. 2 also includes first and second cross frame members 119, 121 each extending from frame member 115 to frame member 117. The cross frame member 119 is positioned adjacent to and inwardly of the sockets 301 at one side of the frame. The cross frame member 121 is positioned adjacent to and inwardly of the sockets 301 at the other side of the frame.

Legs 102 may be stabilised at set distances by linking bars 106, 107 which may be secured to the legs by internal nuts, by devises, by pins, or by any other fixing method holding legs 102 a fixed distance apart at floor level. There is no linking bar along one edge to allow unimpeded access for a potential occupant. As shown there are four leg posts 102 but the pod may have three legs or more than four, provided that it provides a stable enclosure not collapsing under the unusual loads placed on it by loose furniture and parts of a building falling on it during an earthquake or tornado.

Figure 2:
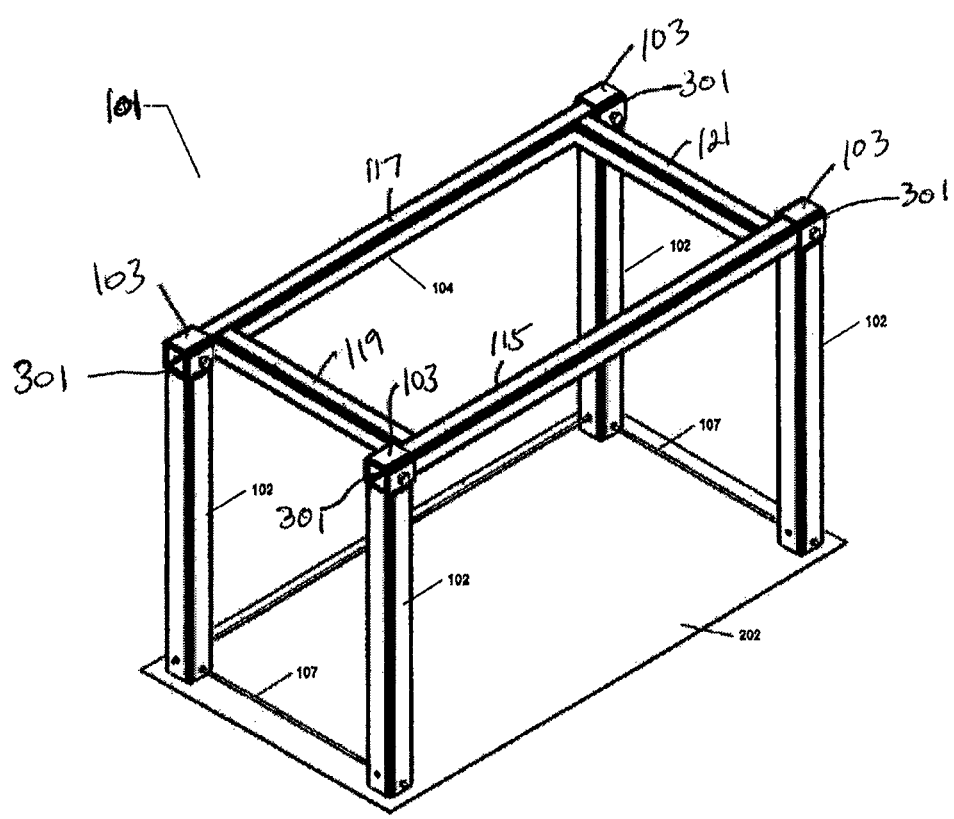
FIG. 2 is a front perspective view of a similar protection pod.
Figure 4:
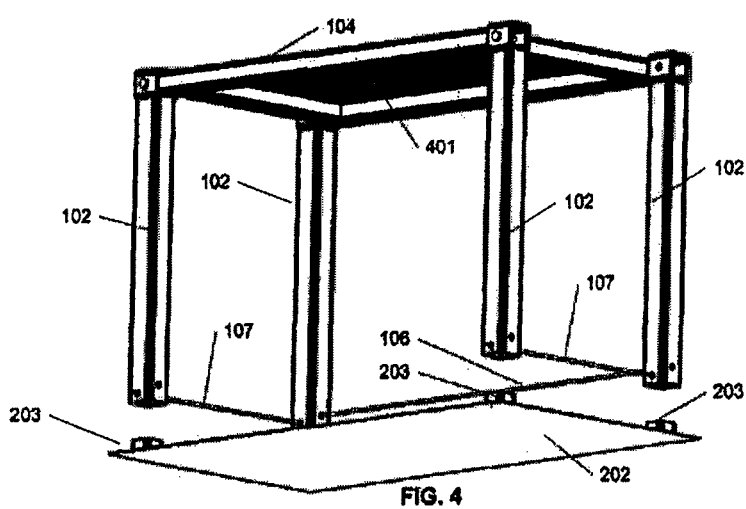
FIG. 4 is a view of a pod with a grid top and a base floor.

FIG. 2 shows the same enclosure of legs 102 and top frame 104 with a floor plate 202 in place. Preferably the floor plate 202 has stubs 203 as seen in FIG. 4 locating the legs in place with the aid of linking bars 107 passing within the stubs to hold the legs to the stubs. The floor plate 202 prevents the legs 102 being driven down through a wooden floor during a heavy impact from above. The floor plate may have a lip along the edges which do not face in the direction of entry to provide additional rigidity. Additionally where an earthquake involves significant lateral forces a pod with a floor plate will retain any occupant, rather than moving about independently of the occupant.

Figure 3:
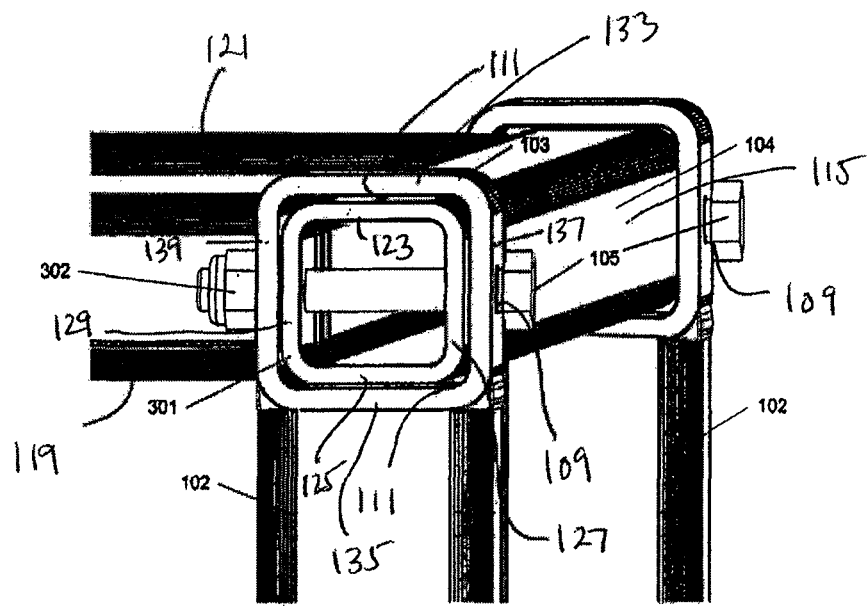
FIG. 3 is a detail view of the joint at the top of each pod leg.

FIG. 3 shows the detail of the connection of frame sockets 103 at the top of legs 102 with the ends 301 of frame 104. Clearance holes 109 in the frame sockets 103 and frame ends 301 receive bolts 105 and locking nuts 302. Note that there is clearance 111 between the frame sockets 103 and the frame ends 301. More specifically, the end 301 of frame member 115 shown in FIG. 3 is a tube with upper and lower walls 123, 125 and side walls 127, 129. The socket 301 that receives this end 301 is shown with upper and lower sections 133, 135 and side sections 137, 139. A portion of the illustrated crush space 111 in FIG. 3 is positioned between walls 123 and 133 and another portion of this crush space 111 is positioned between walls 125 and 135. A bolt receiving hole extends through the side walls of the socket and end. This intentional clearance provides a crush space 111 which is intended to allow the initial crushing down under overload of the top of frame socket 103 onto the frame ends 301, and after this space is taken up to allow the collapse of the side walls 127, 129, 137, 139 of both frame sockets 103 and frame ends 301 inwards where weakened by the holes receiving bolt 105. If the top loading is sufficient the socket 103 and bracing frame end 301 will collapse by a significant amount, reducing the impact loading on the leg 102 itself.

FIG. 4 shows a bottom perspective view of the pod with a top intrusion guard 401 fitted to prevent intrusion of stray items from above and to add transverse rigidity. The intrusion guard 401 may be of perforated sheet metal secured to frame 104 by tack welding or may be a steel bar grid. The figure also shows the stubs 203 typically welded to the floor plate 202 which may have a leg mounted over them to be secured by passing a linking bar 107 through leg 102 and stub 203.

Figure 5:
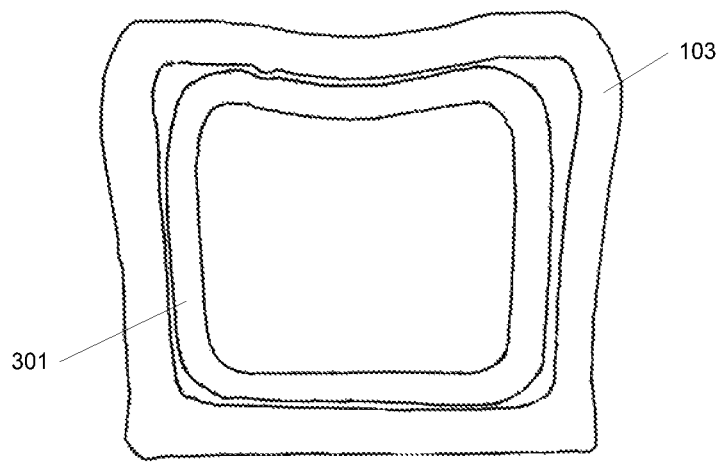
FIG. 5 is a view of the top leg joint after impact by a heavy vertical load.

FIG. 5 shows the profile of a frame socket 103 and frame end 301 which has been subjected to a 2 ton weight falling 10 feet. As can be seen the frame socket 103 has been significantly compressed, as has the frame end 301, however neither has been compressed to the extent that the side walls have caved inwards, so there is still significant resistance to compression remaining before the post beneath the frame socket is subjected to an impact rapid enough to cause failure and compression of the space within the pod.

The crushing inwards of the walls of the frame sockets 103 and frame ends 301 may be aided if packing washers (not shown) are inserted to take up the side gap between the side walls of the two tubes, and if bolt 105 and nut 302 are initially tensioned to stress the side wall of frame sockets 103 inwards.

The entire protection pod is of parts which can be assembled on site, allowing the parts to be easily carried to the desired location.

While the drawings show horizontal linking bars these may be replaced by linking bars at 45 degrees to the vertical to provide more resistance to shearing forces, or by transverse welded beams. Any linking bars may be secured by devises, by locking pins, by nuts or by some locking configuration which receives the bars during assembly to retain them once assembled.

While the pod displayed has four supporting legs a viable pod may have three or more, depending on the number of persons to be sheltered and the space available.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the protection pod may vary dependent on the particular application for which it is used without variation in the spirit and scope of the present invention.

In addition, although the preferred embodiments described herein are directed to protection pods for use in an earthquake situation, it will be appreciated by those skilled in the art that variations and modifications are possible within the scope of the appended claims, for instance the pod could be used in a tornado area if grid walls are provided on the version shown in FIG. 4.

The protection pod may also be stored and transported in the form of a flatpack, the flackpack comprising all of the components ready to be assembled into the end product.

INDUSTRIAL APPLICABILITY

The protection pod of the invention is usable in the protection of life in locations in which objects damaging to a person may fall, such as buildings likely to be involved in earthquakes or tornadoes, mines or quarries. The present invention is therefore industrially applicable.

The invention claimed is:

1. A protection pod, comprising:
   four elongate legs each with respective upper and lower ends, the legs capable of resting substantially vertically on a floor, the protection pod being assembled with each leg positioned at a respective corner of the protection pod;
   a bracing frame including first and second frame members, the first and second frame members having respective first and second ends;
   a first lower brace extending from a first leg to a second leg of the legs, a second lower brace extending from the second leg to a third leg of the legs, and a third lower brace extending between the third leg and a fourth leg of the legs, the protection pod being without any lower brace extending between the fourth leg and the first leg so as to facilitate entry by a user into the protection pod in the lower brace free space between the fourth leg and the first leg;
   each leg having at the upmost end a socket capable of receiving laterally within itself a respective one of the ends of the bracing frame, the bracing frame and legs being positioned at right angles to one another when the ends of the bracing frames are positioned substantially within respective sockets, wherein the sockets and bracing frame ends each have respective first and second side walls with a fastener receiving opening extending through the first and second side walls of each socket and first and second side walls of each of the bracing frame ends, and with respective bolts inserted through the respective fastener receiving openings of each socket and bracing frame and positioned in the socket, the bolts being under tension so as to stress the side walls of the frame sockets inward; and
   each socket being sized larger than the received end of the bracing frame to provide a clearance vertically between the socket and received end that is a crush space into which the socket will crush downwardly under loading on the upmost end of the socket.

2. A protection pod as claimed in claim 1 wherein the braces are lateral.

3. A protection pod as claimed in claim 1 wherein the braces are at an angle and in the plane between the respective legs.

4. A protection pod as claimed in claim 1 wherein the protection pod has a floor plate, and wherein the protection pod is capable of being assembled with the floor plate being affixed to the lowermost end of each leg of the protection pod.

5. A protection pod as claimed in claim 4 wherein the floor plate has a stub fitting within each leg of the pod.

6. A protection pod as claimed in claim 1 wherein the socket at the upmost end of a leg has a lower crush resistance to vertical forces than the remainder of the substantially vertical leg of which it forms a part.

7. A protection pod as claimed in claim 1 wherein the pod is dismantleable and relocatable.

8. A flatpack comprising components for assembly into a protection pod as claimed in claim 1 with the legs, sockets and bracing frame being sized to fit under an office desk.

9. A protection pod according to claim 1 wherein the crush space is provided between an upper wall of the bracing frame end and an upper socket wall of the socket that receives the bracing frame end.

10. A protection pod according to claim 9 wherein the crush space is also provided between a lower wall of the bracing frame end and a lower socket wall of the socket that receives the bracing frame end.

* * * * *